Figure 1:
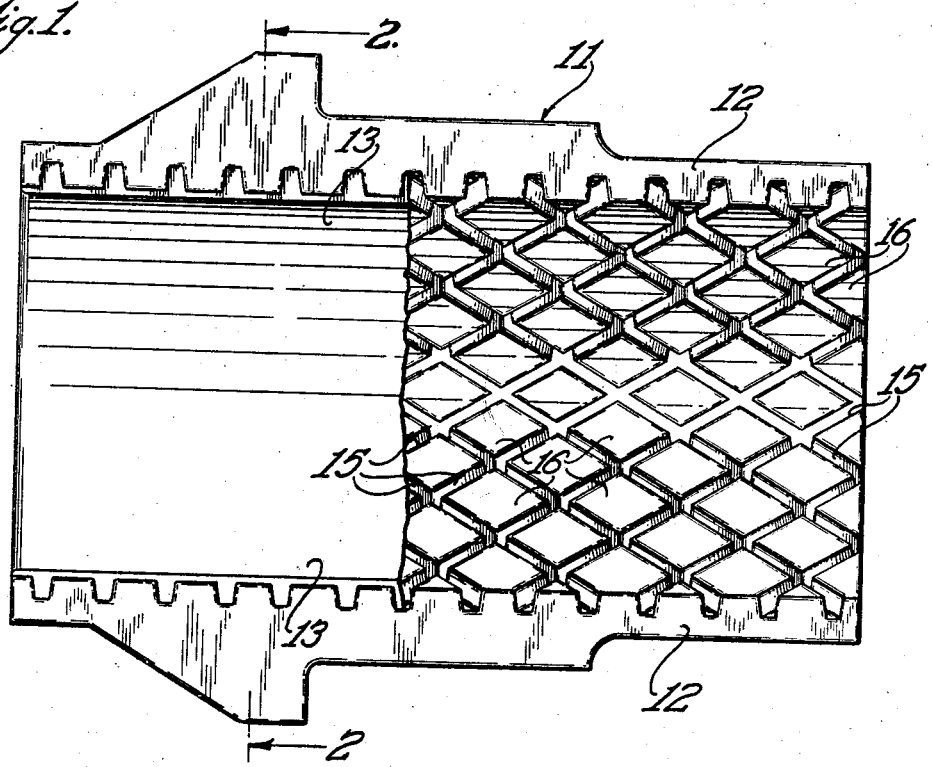

May 20, 1941.  R. J. SHOEMAKER ET AL  2,242,439
METHOD OF MAKING JOURNAL BEARINGS
Original Filed Aug. 15, 1938

INVENTORS.
Robert J. Shoemaker
Charles M. House
BY
Charles B. Rasmussen
ATTORNEY.

Patented May 20, 1941

2,242,439

UNITED STATES PATENT OFFICE 2,242,439

METHOD OF MAKING JOURNAL BEARINGS

Robert J. Shoemaker and Charles M. House, Chicago, Ill., assignors, by mesne assignments, to National Lead Company, a corporation of New Jersey Original application August 15, 1938, Serial No. 224,995. Divided and this application August 15, 1938, Serial No. 224,996

2 Claims. (Cl. 29—149.5)

This invention relates in general to bearings, and more particularly to an improved method of making the same.

In our co-pending application Serial No. 224,995, filed concurrently herewith, and of which this application is a division, a compound journal bearing is disclosed which comprises a main body or backing member of brass, bronze, or other suitable relatively hard material, having a bearing surface with grooves formed therein, to which is applied a lining portion of a relatively soft metallic compound consisting of the following substances in proportions by weight approximately as follows: tin 0.5% to 2.0%, calcium 0.3% to 1.0%, mercury 0.1% to 0.5%, aluminum 0.02% to 0.1%, and metal from the group consisting of magnesium, potassium and lithium 0.02% to 0.22%, together with lead to make up 100%. This lining portion is disposed within the grooves in the bearing surface of the backing member and over such surface to provide a very thin layer thereon.

A principal object of the instant invention is the provision of a simple and effective method of making such a bearing.

Numerous other objects and advantages of the invention will be apparent as it is better understood from the following description, which, when taken in connection with the accompanying drawing, discloses a preferred embodiment thereof.

Figure 2:
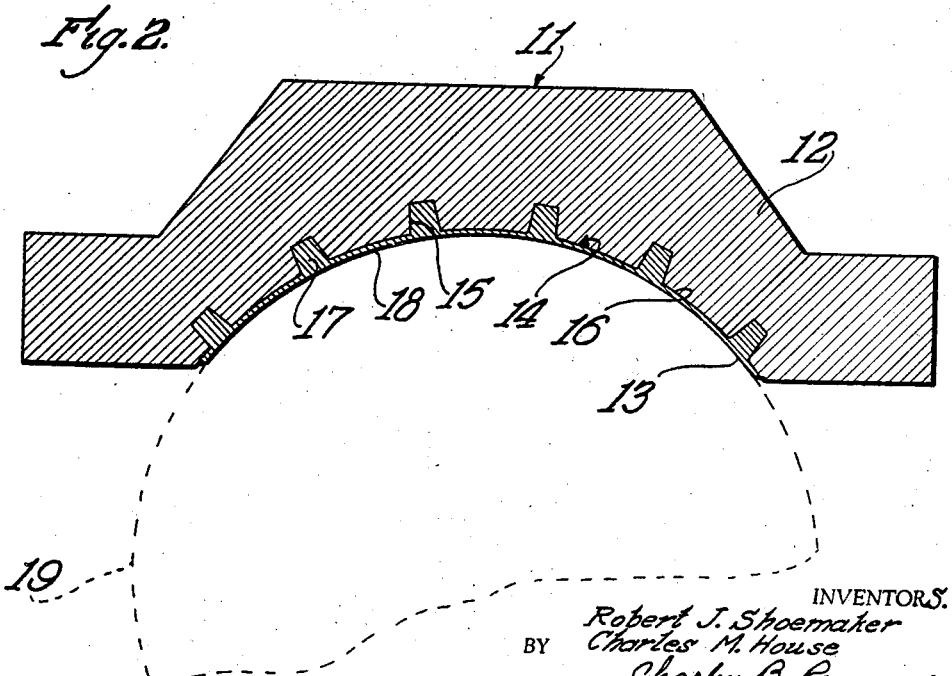

In the drawing:

Figure 1 is a bottom plan view of a journal bearing made in accordance with the instant invention, with part of the lining thereof broken away; and Fig. 2 is a vertical sectional view taken substantially on the line 2—2 of Fig. 1.

Referring more particularly to the drawing, reference numeral 11 indicates in general a journal bearing illustrating a preferred type of bearing to which the instant method is applicable. This bearing comprises a backing member or body portion 12 and a bearing facing or lining portion 13. The backing member 12 is cast from brass, bronze, or any other suitable relatively hard metal, and is provided with the usual curved bearing surface 14. The bearing surface 14 is preferably cast to a very slightly larger curvature than required size, and has a plurality of grooves or recesses 15 formed therein.

These recesses 15 are in the form of two sets of diagonal grooves, the grooves of each set being spaced in parallel relationship to each other, and the grooves of the two sets interconnecting to provide spaced, diamond-shaped portions 16 on the curved surface 14. The cross sectional shape of each groove 15 is that of a truncated isosceles triangle. The area of the diamond-shaped portions 16 is substantially 60% of the total area of the curved surface 14. The grooves 15 taper inwardly from the surface 14 in such manner that their area in a plane concentric with that of the surface 14 adjacent their bottoms is approximately 25% of the total area of such plane. If it is desired, the grooves 15 may be machined in any suitable manner in the backing member 12 as a separate step subsequent to the casting of the latter.

The next step in the method of making the instant bearing 11 is the tinning of the diamond-shaped portions 16 of the surface 14 and the grooves 15 of the backing member 12. In order to get the tin or solder to adhere properly to these surfaces, it is preferable to pickle the surface for approximately 10 minutes, or until bright and clean, in a solution of approximately 50% commercial muriatic acid and 50% water. The pickled surfaces should be flushed with clear water, and the moisture may be blown off with an air hose. These surfaces are then fluxed, and 70–30 solder is applied thereto at a temperature of between 650° F. and 700° F.

The bearing metal which is used for the lining portion 13 is then poured as quickly as possible, and in such a manner as to avoid washing the solder from the tinned surface. This may be accomplished by pouring the bearing metal at a point or points where it will have to run the least distance to cover the entire surface 14.

It has been found that only one particular type of soft metal gives entirely satisfactory results when used for the lining portion 13 of the instant bearing 11. This particular soft metallic compound consists of the following substances in proportions by weight approximately as follows:

Tin, 0.5% to 2.0%, preferably 1.0%;
Calcium, 0.3% to 1.0%, preferably 0.5%;
Mercury, 0.1% to 0.5%, preferably 0.25%;
Aluminum, 0.02% to 0.1%, preferably 0.05%;
Magnesium, 0.05% to 0.1%, preferably 0.075%; and/or
Potassium, 0.02% to 0.06%, preferably 0.04%; and/or
Lithium, 0.02% to 0.06%, preferably 0.04%
Lead, to make up 100%

The above metallic compound should be between 950° F. and 1100° F. at the time of pouring, preferably nearer 1100° than 950°. Sufficient bearing metal is poured, and a suitable mandrel or mold is employed, to not only fill the grooves 15, but also to cover the surface 14 with a thin layer 18 of the bearing metal.

After this lining portion 13 has cooled, and particularly after the solder has solidified, since the latter takes place at a lower temperature than the melting temperature of the instant bearing metal, the lining portion 13 is machined or otherwise finished to the required curvature, namely to substantially the same curvature as that of the journal 19 with which the bearing is adapted to be used.

With the above-described method, it has been found that the instant journal bearing, the particular advantages of which are fully set forth in the above-referred to application, is most efficaciously produced.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

We claim:

1. The method of making a journal bearing, comprising casting a relatively hard metal backing member of a copper base alloy to form a bearing surface of slightly larger curvature than required size and having a plurality of recesses therein, tinning said surface and said recesses with 70–30 solder applied thereto at a temperature of between 650° F. and 700° F., immediately casting a lining portion on said backing member to fill said recesses and to cover said surface with a thin layer of metal consisting of the following substances in proportions by weight approximately as follows: tin 0.5% to 2.0%, calcium 0.3% to 1.0%, mercury 0.1% to 0.5%, aluminum 0.02% to 0.1%, and metal from the group consisting of magnesium, potassium and lithium 0.02% to 0.22%, together with lead to make up 100%, by pouring the same thereon at a temperature between 950° F. and 1100° F. and substantially at the center of the bearing surface of said backing member, and finishing said lining portion to a curvature of required size.

2. The method of making a journal bearing, comprising casting a relatively hard metal backing member of a copper base alloy to form a bearing surface of slightly larger curvature than required size, then machining a plurality of recesses in said bearing surface, tinning said surface and said recesses with 70–30 solder applied thereto at a temperature of between 650° F. and 700° F., immediately casting a lining portion on said backing member to fill said recesses and to cover said surface with a thin layer of metal consisting of the following substances in proportions by weight approximately as follows: tin 0.5% to 2.0%, calcium 0.3% to 1.0%, mercury 0.1% to 0.5%, aluminum 0.02% to 0.1%, and metal from the group consisting of magnesium, potassium and lithium 0.02% to 0.22%, together with lead to make up 100%, by pouring the same thereon at a temperature between 950° F. and 1100° F. and substantially at the center of the bearing surface of said backing member, and finishing said lining portion to a curvature of required size.

ROBERT J. SHOEMAKER.
CHARLES M. HOUSE.